United States Patent [19]
Obara

[11] Patent Number: 4,801,779
[45] Date of Patent: Jan. 31, 1989

[54] WIRE ELECTRODE TYPE ELECTRICAL DISCHARGE MACHINING EQUIPMENT

[75] Inventor: Haruki Obara, Sagamihara, Japan

[73] Assignee: Fanuc Ltd, Minamitsuru, Japan

[21] Appl. No.: 30,849

[22] PCT Filed: Jun. 11, 1986

[86] PCT No.: PCT/JP86/00289

§ 371 Date: Mar. 12, 1987

§ 102(e) Date: Mar. 12, 1987

[87] PCT Pub. No.: WO86/07294

PCT Pub. Date: Dec. 18, 1986

[30] Foreign Application Priority Data

Jun. 15, 1985 [JP] Japan .................. 60-129137

[51] Int. Cl.⁴ .................. B23H 7/04; B23H 7/06
[52] U.S. Cl. .................. 219/69 W; 219/69 C
[58] Field of Search .................. 219/69 W, 69 C; 364/474, 475; 204/206

[56] References Cited

U.S. PATENT DOCUMENTS

| | | | |
|---|---|---|---|
| 4,499,359 | 2/1985 | Obara | 219/69 W |
| 4,510,367 | 4/1985 | Obara | 219/69 W |
| 4,523,073 | 6/1985 | Gamo et al. | 219/69 W |
| 4,559,601 | 12/1985 | Kishi et al. | 219/69 W |

FOREIGN PATENT DOCUMENTS

| | | | |
|---|---|---|---|
| 54-39297 | 3/1979 | Japan . | |
| 500405 | 2/1981 | Japan . | |
| 56-39825 | 4/1981 | Japan | 219/69 W |
| 58-28424 | 2/1983 | Japan | 219/69 W |
| 655884 | 5/1986 | Switzerland | 219/69 W |

Primary Examiner—Roy N. Envall, Jr.
Assistant Examiner—Geoffrey S. Evans
Attorney, Agent, or Firm—Staas & Halsey

[57] ABSTRACT

A wire electrode type electrical discharge machining apparatus is provided with a taper-machining controller which is capable of conducting taper-machining with high accuracy, even in the case where the rigidity of the electrode varies due to the variation of the temperature thereof following the variation of the electric current flowing therein. The information representing the relations between a machining current and a taper-angle in the entire controllable range of a taper-angle to be controlled is prepared in advance and stored in a memory. A means for setting a machining current, a means for program-inputting a machining current, or a means for sensing a machining current is provided. The above information is read by a correction means, in response to the machining current which was set, program-input, or sensed by one of the above presented means, before it is input to the taper-machining controller, which corrects the taper-angle. In one embodiment, the taper machining controller computes the correct taper angle. With this corrected taper angle, tapper-machining can be conducted with high accuracy.

3 Claims, 8 Drawing Sheets

WIRE ELECTRODE TYPE ELECTRICAL DISCHARGE MACHINING EQUIPMENT

BACKGROUND OF THE INVENTION

1. Field of the Invention

This invention relates to an improvement applicable to a wire electrode type electrical discharge machining apparatus. More specifically, this invention relates to an improvement applicable to a taper-machining controller for the purpose of enabling a wire electrode type electrical discharge machining apparatus to perform taper-machining with high accuracy, even in situations in which the hardness or rigidity of a wire electrode varies due to variations of the temperature thereof following variation of the magnitude of electric current flowing therein.

2. Description of the Related Art

Wire electrode type electrical discharge machining is classified into two independent categories. The first category ordinary machining, wherein a wire electrode is maintained in a direction perpendicular to the direction in which a workpiece is moved during a machining process. The second category is taper-machining, wherein a taper-angle, which is defined as an angle between the direction of a wire electrode and the direction perpendicular to the direction in which a workpiece is moved, or as an angle by which the wire electrode is inclined, is maintained at a value which is not zero degrees, or is varied, during a machining process.

Referring to FIG. 1, taper-machining is realized by controlling a taper-angle $\theta$ which is determined by the direction 22 which is perpendicular to the lower plane 21 of a workpiece 2 and the direction of a wire electrode 1 (an angle by which a wire electrode is inclined (from vertical). In the case where the wire electrode 1 is sharply bent at the vertexes A, B, as shown in FIG. 1, taper-machining can be realized by using a servomechanism which moves one of the vertexes A, B in a plane parallel to the lower plane of the work 2 or perpendicular to the wire electrode 1 (or from side to side in the drawing).

However a wire electrode 1 is elastic, and the magnitude of tension required to be applied to the wire electrode 1 during an electrical discharge machining process should be determined based on the diameter of the wire electrode 1. Therefore, referring to FIG. 2, particularly in instances where die type guides are employed for guiding the wire electrode 1, vertexes AA, BB, which are determined on the basis that the wire electrode 1 is sharply bent, do not conform to points C, D, at which the wire electrode 1 is actually detached from each of the upper and lower wire electrode guides 3, 4. Further, since the magnitude of this nonconformity between the vertexes AA, BB and the points C, D is not necessarily constant but varies depending on various conditions, a less than satisfactory magnitude of accuracy is caused in wire electrode type electrical discharge machining.

This drawback can be removed by employing a servomechanism which moves one of the assumed hypothetical vertexes, paying attention to various parameters, including the elasticity of the wire electrode 1, the required magnitude of tension to be applied to the wire electrode 1 during an electrical discharge machining process, the potential magnitude of nonconformity between the aforementioned vertexes and the actual points at which the wire electrode 1 is detached from each of the upper and lower die type wire electrode guides 3, 4, and the like. Particularly because a wire electrode type electrical discharge machining apparatus necessarily employs a computer, such as a numerical control system, a wire electrode type electrical discharge machining apparatus can readily be provided with this type of improved servomechanism, which corrects the points along which a servomechanism moves for taper-machining. Therefore, I completed an invention directed to a wire electrode type electrical discharge machining apparatus providing such a servomechanism as is described above, wherein a computer is employed to apply the aforementioned correction to the point which is moved by a servomechanism for taper-machining. An international patent application, No. PCT/JP86/54 was filed in the Japanese Patent Office as the receiving office on Feb. 7, 1986 for this invention.

However, this newly developed wire electrode type electrical discharge machining apparatus still has a further drawback to be removed. The above-mentioned apparatus lacks a means for correction of potential harmful influences caused by variation of hardness or rigidity of the wire electrode due to variation of the temperature therein due to variation of the magnitude of electric current flowing therein. The above-mentioned apparatus is provided with a servomechanism which controls the taper-angle $\theta$ by moving hypothetical vertexes, which are assumed, paying attention to various parameters, including the elasticity of the wire electrode, the required magnitude of tension to be applied to the wire electrode during an electrical discharge machining process, the potential magnitude of nonconformity between the aforementioned assumed vertexes and the actual point at which the wire electrode is actually detached from each of the upper and lower die type wire electrode guides, and the like. Therefore, this improved type wire electrode type electrical discharge machining apparatus is provided with the aforementioned taper-machining controller, and address the drawback wherein the machining error slightly increases whenever the magnitude of the machining current varies.

SUMMARY OF THE INVENTION

An object of this invention is to provide a wire electrode type electrical discharge machining apparatus which performs taper-machining with high accuracy, even in situations in which a wire electrode varies its hardness due to variation of the temperature thereof following the variation of the magnitude of electric current flowing therein.

Another object of this invention is to realize higher accurracy taper-machining control by employing a computer.

A wire electrode type electrical discharge machining apparatus in accordance with the first embodiment of this invention which satisfies the aforementioned object comprises: a wire electrode type electrical discharge machining apparatus which includes a taper-machining controller which controls a taper-angle $\theta$ (an angle between the direction of a wire electrode which is extended between two wire guides and a specific direction) based on a condition in which no electric current is flowing in the aforementioned wire electrode 1, such control being realized by moving one of the two wire guides in a plane parallel to the other plane along which the other of the wire guides is moved, the improvement comprising a memory means which memorizes parameters indicating relations between a machining current and the taper-angle $\theta$ required corresponding to the machining current, and a machining current setting means for setting a machining current, and wherein the taper-machining controller 9 further comprises a correction means which reads out of memory means, a taper-angle $\theta$ required corresponding to the machining current which was set by the machining current setting means, and sets this required taper-angle $\theta$ to the taper-machining controller.

A wire electrode type electrical discharge machining equipment in accordance with the second embodiment of this invention which satisfies the aforementioned object includes a wire electrode type electrical discharge machining equipment provided a taper-machining controller which controls a taper-angle $\theta$ (an angle between the direction of a wire electrode which is extended between first and second wire guides and a specific direction), based on a condition in which no electric current is flowing in the aforementioned wire electrode 1, such control being realized by moving the first wire guide in a first plane parallel to a second plane along which the second the wire guide is moved, the improvement comprising the wire electrode type electrical discharge machining apparatus further including a memory means which memorizes parameters indicating relations between a machining current and the taper-angle $\theta$ required corresponding to the machining current, and a machining current program-inputting means which sequencially varies a machining current following a predetermined program, and wherein the taper-machining controller further comprising a correction means which reads out of the memory means a taper-angle $\theta$ required corresponding to the machining current which was program-input by the machining current program-inputting means and sets the required taper-angle $\theta$ to the taper-machining controller.

A wire electrode type electrical discharge machining equipment in accordance with the third embodiment of this invention which satisfies the aforementioned object includes a wire electrode type electrical discharge machining apparatus including a taper-machining controller which controls a taper-angle $\theta$ (an angle between the direction of a wire electrode which is extended between first and second wire guides and a predetermined direction), based on a condition in which no electric current is flowing in the wire electrode 1, such control being realized by moving first wire guide in a plane parallel to the other plane along which the other wire guide is moved, the improvement comprising the wire electrode type electrical discharge machining apparatus further comprising a machining current sensing means, and a memory means which memorizes parameters indicating relations between a machining current and the taper-angle $\theta$ required corresponding to the machining current, and wherein (b) the taper-machining controller further comprises a correction means which reads, out of the memory means, a taper-angle $\theta$ required corresponding to the machining current sensed by the machining current sensing means, and sets the required taper-angle $\theta$ to the taper-machining controller.

The principle which is the basis of this invention will be described below. A variation of a required taper-angle $\theta$, $\Delta\theta$, varies approximately in proportion to the variation of the machining current with a parameter in terms of the initially set taper-angle $\theta$, as shown in FIG. 3. Therefore, (a) provided the relations between variation of the machining current and a variation of a required taper-angle $\theta$, $\Delta\theta$, is known for the entire controllable range of the taper-angle, and (b) provided: (i) a machining current setting means which sets a machining current in a correction means; (ii) a machining current program-inputting means which sequentially inputs or varies a machining current; or (iii) a machining current sensing means which senses the magnitude of the machining current flowing in the machining gap, is available, then, (c) it is possible to conduct taper-machining with high accuracy, (i) by causing the correction means to read the optimum amount of taper-angle $\theta$ out of the memory means, following the amount of machining current which was set in the taper-machining controller, (ii) by causing the correction means to read the optimum amount of taper-angle $\theta$ out of the memory means, following the amount of machining current which was program-input in the taper-machining controller, or (iii) by causing the correction means to read the optimum amount of taper-angle $\theta$ out of the memory means or to calculate the optimum amount of taper-angle $\theta$, following the amount of the machining current sensed with the machining current sensing means, so that the initial taper-angle $\theta$ is allowed to be corrected to the optimum amount corresponding to the actual physical conditions of the wire electrode, before it is used for taper-machining.

BRIEF DESCRIPTION OF THE DRAWINGS

A detailed description will be presented below for a wire electrode type electrical discharge machining apparatus in accordance with three embodiments of this invention, referring to drawings itemized below.

DETAILED DESCRIPTION OF PREFERRED EMBODIMENTS

FIRST EMBODIMENT

Figure 4:
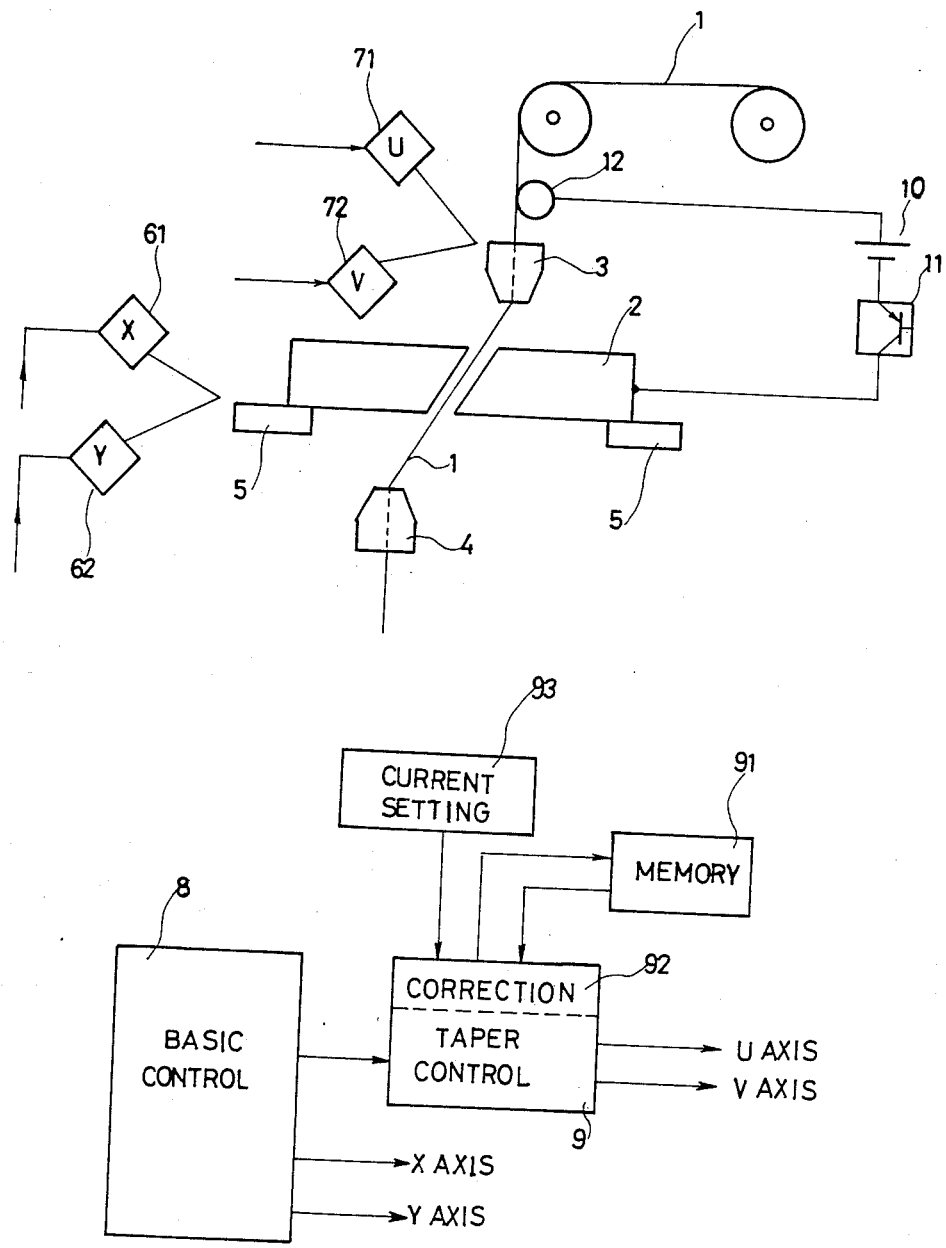
FIG. 4 is a schematic view of a wire electrode type electrical discharge machining apparatus according to the first embodiment of this invention.

Referring to FIG. 4, a wire electrode 1 is guided by upper and lower wire electrode guides 3, 4. The upper guide 3 is supported by an upper arm (not shown) and the lower guide 4 is supported by a lower arm (not shown). The wire electrode 1 is extended under tension between the upper and lower guides 3,4. A work piece 2 is supported by a movable table 5 arranged between the two guides which is movable in the X-Y directions. The movable table 5 is driven by a set of X-Y axis servomechanism 61, 62 in the X-Y directions. A set of U-V axis servomechanisms 71, 72 drives the upper guide 3 alone to conduct taper-machining.

Albeit the taper-machining can be realized by relative moves of the upper and lower guides 3, 4 in reverse directions to each other, the upper guide 3 alone is designed to be moved in this embodiment.

A basic controller 8 commands the entire control of the wire electrode type electrical discharge machining apparatus including, that of the X-Y axis servomechanisms 61, 62. A taper-machining controller 9 commands the U-V axis servomechanisms 71, 72. These functions can readily be realized by employing software or a computer.

A DC power supply 10 supplies electric current pulses the machining gap (which appears between the wire electrode 1 and the workpiece 2) through an intermittent switch 11, e.g. a power FET, of which one terminal is connected to the workpiece 2 and of which the other terminal is connected to the wire electrode 1 through the power supply 10 and a current feeder roller 12.

Figure 1:
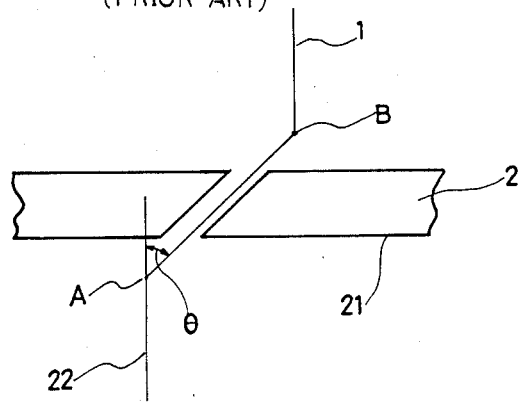
FIG. 1 is a schematic view illustrating the principle of taper-machining.
Figure 3:
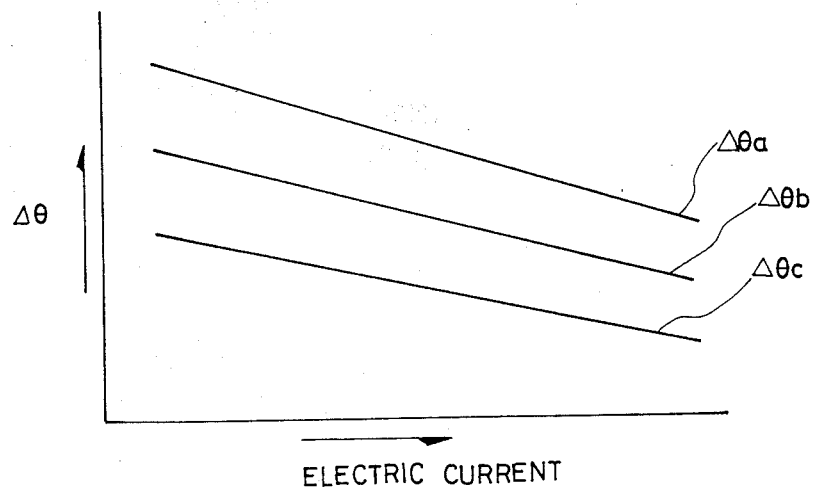
FIG. 3 is a graph illustrating the relations between the variations in the taper-angle $\theta$ and the variations in the machining current.
Figure 2:
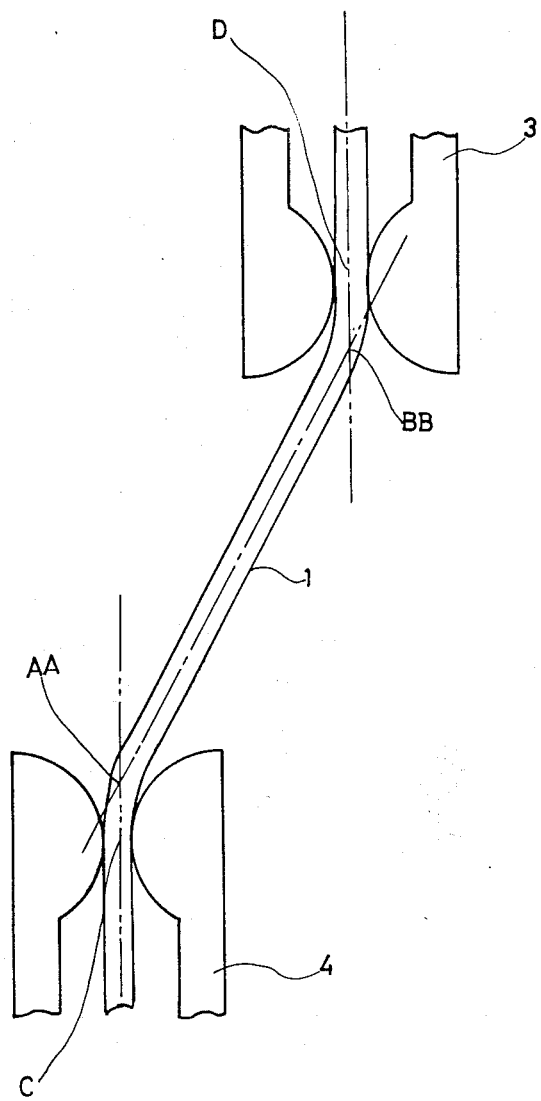
FIG. 2 is a schematic view of a prior art taper-machining apparatus illustrating drawbacks associated with the prior art

A memory means 91 memorizes parameters indicating the relations between the machining current and the taper-angle $\theta$ which were described earlier in reference to FIG. 3. A machining current setting means 93 is employed for setting a machining current in the taper-machining controller 9. A correction means 92 has a function to read, out of the memory means 91, a taper-angle $\theta$ required corresponding to the machining current which was set by the machining current setting means 93, and sets this taper-angle $\theta$ to the taper-machining controller 9.

When wire electrode type electrical discharge machining is conducted, the basic controller 8 is input with the basic command information by means of a numerical information transmission media e.g. a paper tape, a magnetic tape or a floppy disc. Then the basic controller 8 controls the intermittent switch 11, the X-Y axis servomechanisms 61, 62, et al.

When taper-machining is conducted, the taper-machining controller 9 is input with the information regarding the taper-angle $\theta$, the information regarding the hardness of the wire electrode 1, the information regarding the kind and structure of the wire guides employed, and the like, so that the taper-machining controller 9 may acquire a corrected taper-angle $\theta$ following the above input of information and control the U-V axis servomechanisms 71, 72 depending on this corrected taper-angle $\theta$.

In other words, the taper-machining controller 9 is designed on the basis that no machining current is flowing in the wire electrode 1 and, accordingly, the temperature of the wire electrode 1 is the same as the ambient temperature, as well as that the wire electrode has a high value for hardness. However, provided the taper-machining controller 9 is input with a machining current by the machining current setting means 93, this machining current is input into the correction means 92 to allow the correction means 92 to read a taper-angle $\theta$ required corresponding to the hardness of the wire electrode 1 at the input temperature, and further corresponding to the machining current flowing therein, and to control the U-V axis servomechanisms 71, 72, following this corrected taper-angle $\theta$.

Figure 5:
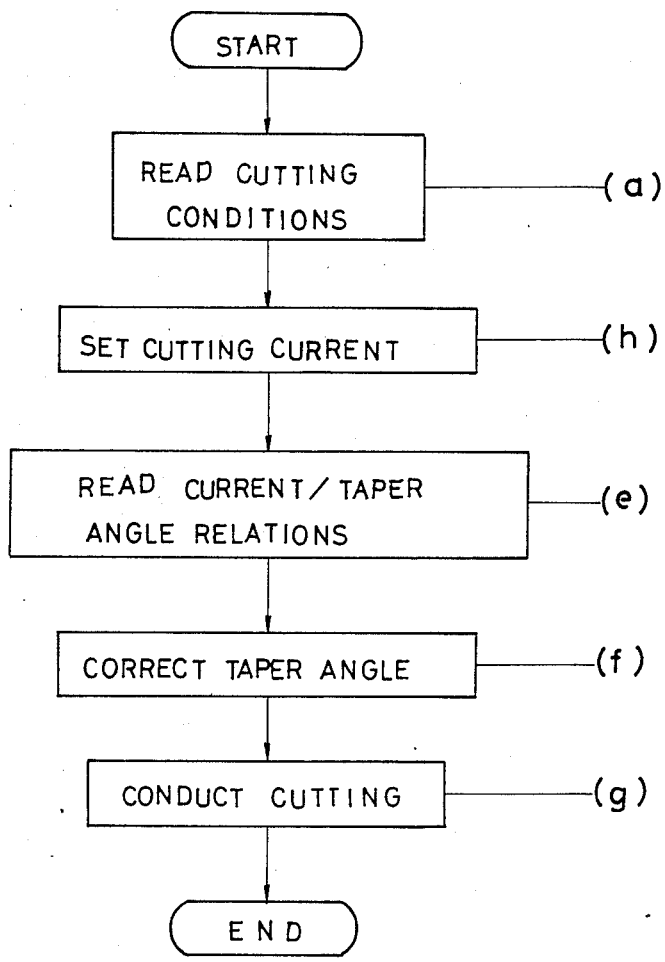
FIG. 5 is a flow chart the operation of the wire electrode type electrical discharge machining apparatus of FIG. 4 in accordance with the first embodiment of this invention.

As repeatedly described earlier, the taper-machining of this invention is conducted by employing a computer. Thus, a flow chart for the taper-machining operation will be presented below, referring to FIG. 5.

The taper-machining controller 9 reads the machining conditions out of the basic controller 8 [step (a)]. As was described above, the taper-angle $\theta$ read out in this step is the one which corresponds to the condition wherein no machining current is flowing in the wire electrode 1 and accordingly, the wire electrode 1 is relatively hard.

When a machining current is set [step (h)], this amount is input into the correction means 92 to allow the correction means 92 to read a taper-angle $\theta$ required corresponding to the hardness of the wire electrode 1 at a temperature corresponding to the aforementioned machining current [step (e)] and to correct the taper-angle $\theta$ accordingly [step (f)]. Using this corrected taper-angle $\theta$, high accuracy taper-machining is realized [step (g)].

SECOND EMBODIMENT

Figure 6:
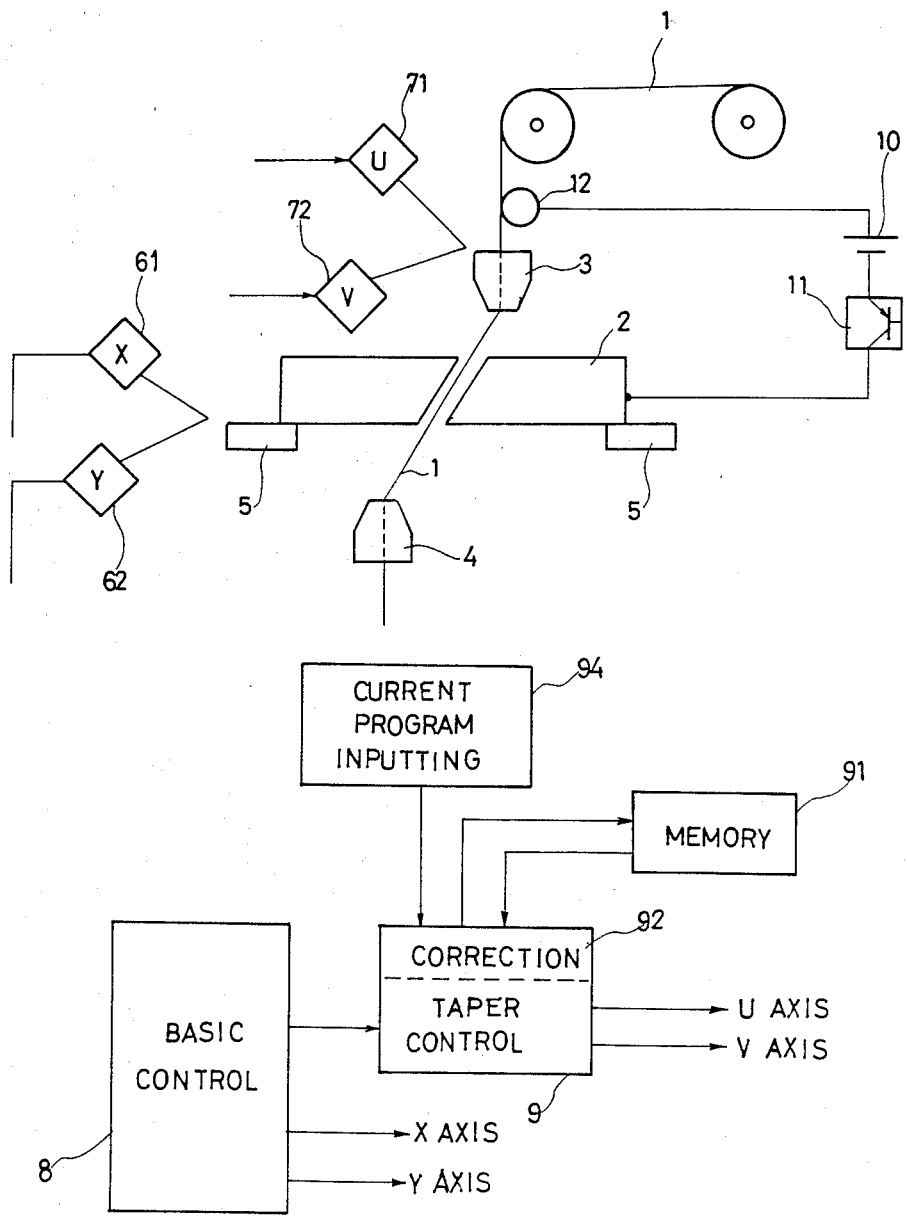
FIG. 6 is a schematic drawing of a wire electrode type electrical discharge machining apparatus in accordance with the second embodiment of this invention.

Referring to FIG. 6, a wire electrode 1 is guided by upper and lower wire electrode guides 3, 4. The upper guide 3 is supported by an upper arm (not shown) and the lower guide 4 is supported by a lower arm (not shown). The wire electrode 1 is extended under tension between these two guides 3, 4. A workpiece 2 is supported by a movable table 5 arranged between the two guides 3, 4, which is movable in the X-Y directions. The movable table 5 is driven by a set of X-Y axis servomechanisms 61, 62 in the X-Y directions. A set of U-V axis servomechanisms 71, 72 drives the upper guide 3 alone to conduct taper-machining.

Although the taper-machining can be realized by relative movement of the upper and lower guides 3, 4 in reverse directions to each other, the upper guide 3 alone is designed to be moved in this embodiment.

A basic controller 8 commands the entire wire electrode type electrical discharge machining apparatus, including the X-Y axis servomechanisms 61, 62. A taper-machining controller 9 commands the U-V axis servomechanisms 71, 72. These functions can readily be realized by employing software or a computer.

A DC power supply 10 supplies electric current pulses across the machining gap (which appears between the wire electrode 1 and the workpiece 2) through an intermittent switch 11, e.g. a power FET, of which one terminal is connected to the workpiece 2 and of which the other terminal is connected to the wire electrode 1 through the power supply 10 and a current feeder roller 12.

A memory means 91 memorizes parameters indicating the relations between the machining current and the taper-angle $\theta$ which were described earlier in reference to FIG. 3. A machining current program-inputting means 94 is employed to program-input a required sequential variation of the machining current. A correction means 92 has a function to read, out of the memory means 91, a taper-angle $\theta$ required corresponding to the machining current which was program-input by the machining current program-inputting means 94, and sets this taper-angle $\theta$ to the taper-machining controller 9.

When wire electrode type electrical discharge machining is conducted, the basic controller 8 is input with the basic command information by means of a numerical information transmission media e.g. a paper tape, a magnetic tape or a floppy disc, prior to the basic controller 8 controlling the intermittent switch 11, the X-Y axis servomechanisms 61, 62, et al.

When taper-machining is conducted, the taper-machining controller 9 is input with data regarding the taper-angle θ, data regarding the hardness of the wire electrode 1, data regarding the kind and structure of the wire guides employed, and the like, so that the taper-machining controller 9 may acquire a corrected taper-angle θ following the above input of data and control the U-V axis servomechanisms 71, 72 depending on this corrected taper-angle θ.

In other words, the taper-machining controller 9 is designed on the basis that no machining current is flowing in the wire electrode 1 and, accordingly, the temperature of the wire electrode 1 is equal to the ambient temperature and that the wire electrode 1 has a high value for hardness. However, provided the taper machining controller 9 is program-input with a machining current which sequentially varies to satisfy requirements in terms of machining shape by the machining current program-inputting means 94, this sequential variation of machining current is input into the correction means 92 to allow the correction means 92 to read a taper-angle θ required corresponding to the hardness of the wire electrode 1 at the input temperature and further corresponding to the machining current flowing therein, and to control the U-V axis servomechanisms 71, 72 following this corrected taper-angle θ.

Figure 7:
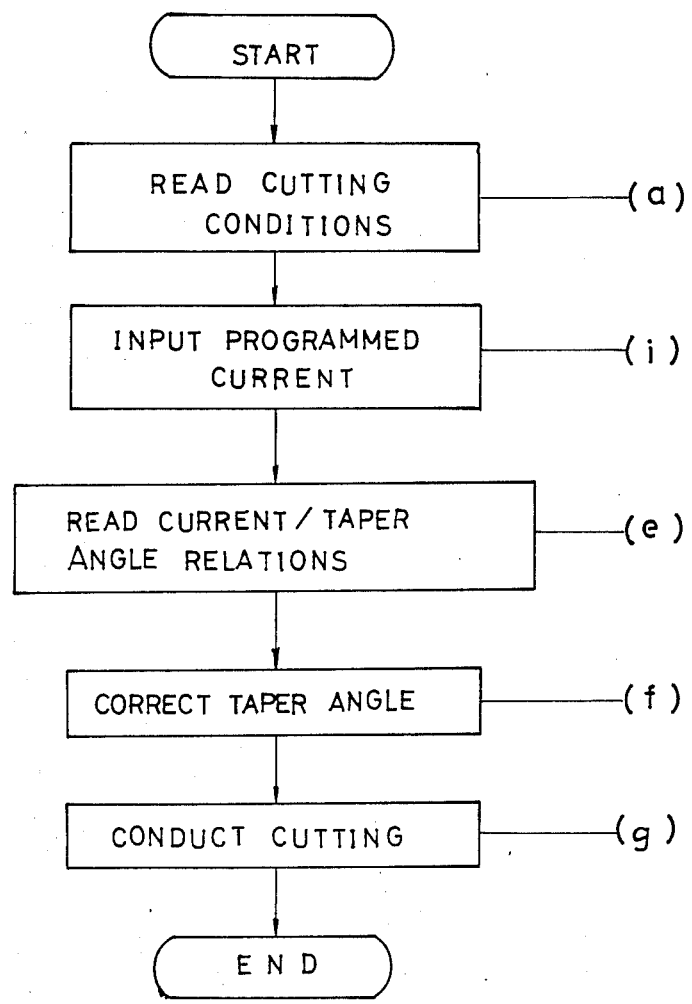
FIG. 7 is a flow chart of a wire electrode type electrical discharge machining apparatus of FIG. 6 in accordance with the second embodiment of this invention.

As repeatedly described earlier, the taper-machining of this invention is conducted by employing a computer. Thus, a flow chart for the taper-machining operation for the second embodiment presented below, referring to FIG. 7.

The taper-machining controller 9 reads the machining conditions out of the basic controller 8 [step (a)]. As was described above, the taper-angle θ read out in this step corresponds to the condition wherein no machining current is flowing in the wire electrode 1 and, accordingly, the wire electrode 1 is relatively hard.

When a sequential variation of machining current is input [step (i)], this amount is input into the correction means 92 to allow the correction means 92 to read a taper-angle θ required corresponding to the hardness of the wire electrode 1 at a temperature corresponding to the aforementioned program-input machining current [step (e)] and to correct the taper-angle θ accordingly [step (f)]. Using this corrected taper angle θ, high accuracy taper-machining is realized [step (g)].

THIRD EMBODIMENT

Figure 8:
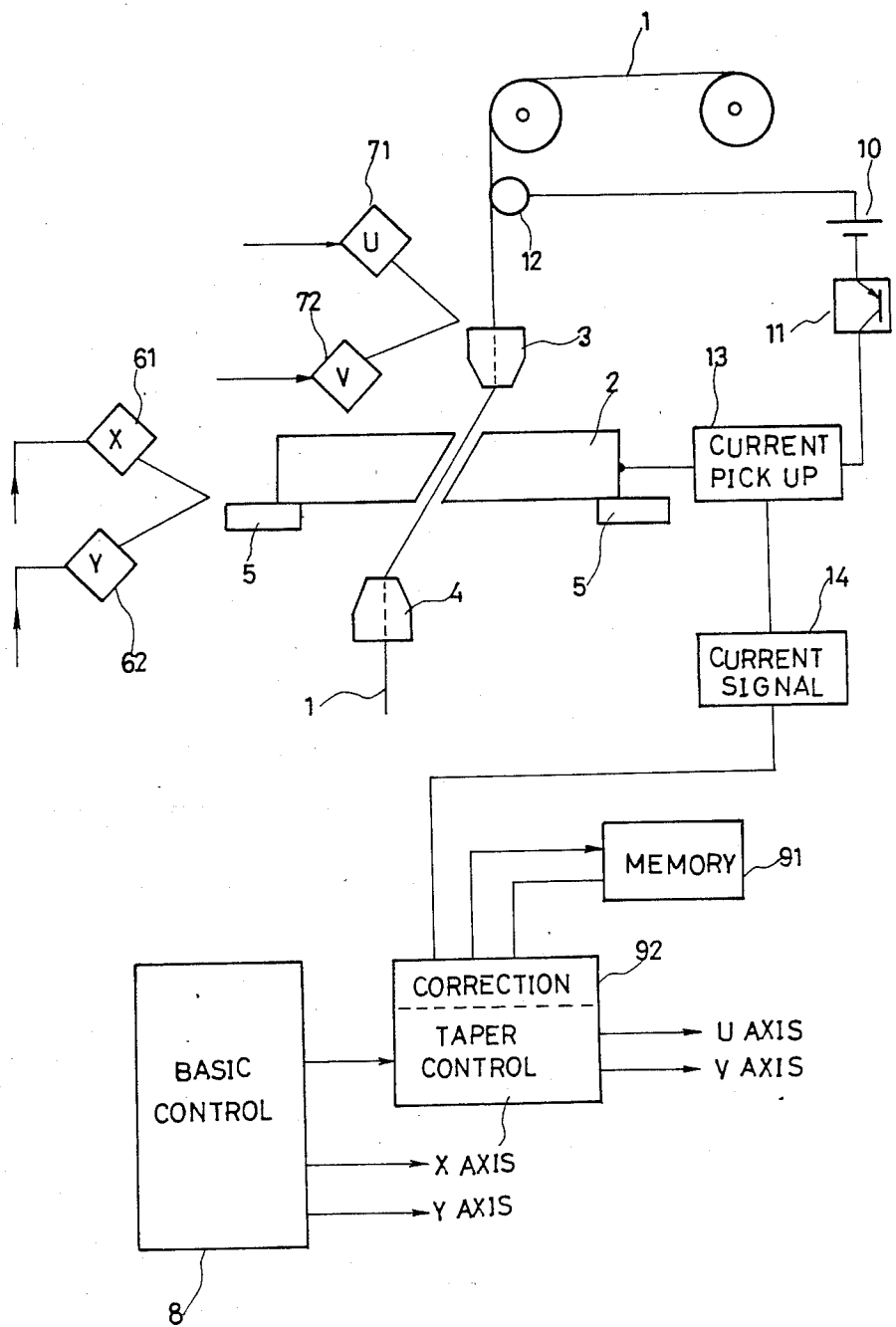
FIG. 8 is a schematic drawing of a wire electrode type electrical discharge machining apparatus in accordance with the third embodiment of this invention.

Referring to FIG. 8, a wire electrode 1 is guided by upper and lower wire electrode guides 3, 4. The upper guide 3 is supported by an upper arm (not shown) and the lower guide 4 is supported by a lower arm (not shown). The wire electrode 1 is extended under tension between these two guides 3, 4. A workpiece 2 is supported by a movable table 5 arranged between the two guides which is movable in the X-Y directions. The movable table 5 is driven by a set of X-Y axis servomechanisms 61, 62 in the X-Y directions. A set of U-V axis servomechanisms 71, 72 drives the upper guide 3 alone to conduct taper-machining.

Although the taper-machining can be realized by relative movement of the upper and lower guides 3, 4 in reverse directions to each other, the upper guide 3 alone is designed to be moved in this embodiment, like the first and second embodiments.

A basic controller 8 commands the entire wire electrode type electrical discharge machining apparatus, including the X-Y axis servomechanisms 61, 62. A taper-machining controller 9 commands the U-V axis servomechanisms 71, 72. These functions can readily be realized by employing software or a computer.

A DC power supply 10 supplies electric current pulses across the machining gap (which appears between the wire electrode 1 and the workpiece 2) through an intermittent switch 11, e.g. a power FET, of which one terminal is connected to the workpiece 2 and of which the other terminal is connected to the wire electrode 1 through the power supply 10 and a current feeder roller 12.

A memory means 91 memorizes parameters indicating the relations between the machining current and the taper-angle θ which were described earlier in reference to FIG. 3. A current sensing means 13 functions to sense the machining current flowing in the wire electrode 1 and to input the sensed current to the taper-machining controller 9 through a current signal generaor 14, in which the sensed current is converted into a number representing the machining current flowing in the wire electrode 1. A correction means 92 reads, out of the memory means 91, a taper-angle θ required corresponding to the machining current which was sensed by the current sensing means 13 and was converted to a number by the current signal generator 14 before being input to the taper-machining controller 9, and sets this taper-angle θ to the taper-machining controller 9.

When wire electrode type electrical discharge machining is conducted, the basic controller 8 is input with the basic command information by means of a numerical information transmission media, e.g. a paper tape, a magnetic tape or a floppy disc, prior to the basic controller 8 controlling the intermittent switch 11, the X-Y axis servomechanisms 61, 62, et al, following thereto.

When taper-machining is conducted, the taper-machining controller 9 is input with data regarding the taper-angle θ, data regarding the hardness of the wire electrode 1, data regarding the kind and structure of the wire guides employed, and the like, so that the taper-machining controller 9 can acquire a corrected taper-angle θ following the above input of data and can control the U-V axis servomechanisms 71, 72 depending on this corrected taper-angle θ.

In other words, the taper-machining controller 9 is designed on the basis that no machining current is flowing in the wire electrode 1 and, accordingly, the temperature of the wire electrode 1 is equal to the ambient temperature and that the wire electrode 1 has a high value for hardness. Therefore, the taper-machining controller 9 initiates taper-machining on the basis of no machining current flowing in the wire electrode. In other words, taper-machining is initiated with the initial taper-angle having been determined on the aforementioned basis or on a basis in which the wire electrode 1 is relative hard. However, as soon as a machining current commences flowing, the machining current sensing means 13 senses the machining current. This sensed machining current is input into the taper machining controller 9 after it is converted into a signal having a numerical value by the current signal generator 14.

After receiving this converted machining current signal, the correction means 92 reads, out of the memory means 91, a taper-angle $\theta$ required corresponding to the hardness of the wire electrode 1 at the input temperature, and further corresponding to the machining current flowing therein, and to control the U-V axis servomechanisms 71, 72 following this corrected taper-angle $\theta$. If required, the correction means 92 conducts some calculations to acquire a taper-angle $\theta$ optimum for the rigidity of the wire electrode 1 which has the electric current flowing therein.

As a result, variation in the rigidity of a wire electrode 1 due to the variation in the magnitude of electric current flowing therein is readily corrected for, resultantly enabling taper-machining to be conducted with high accuracy, regardless of the magnitude of electric current flowing in the wire electrode 1.

Figure 9:
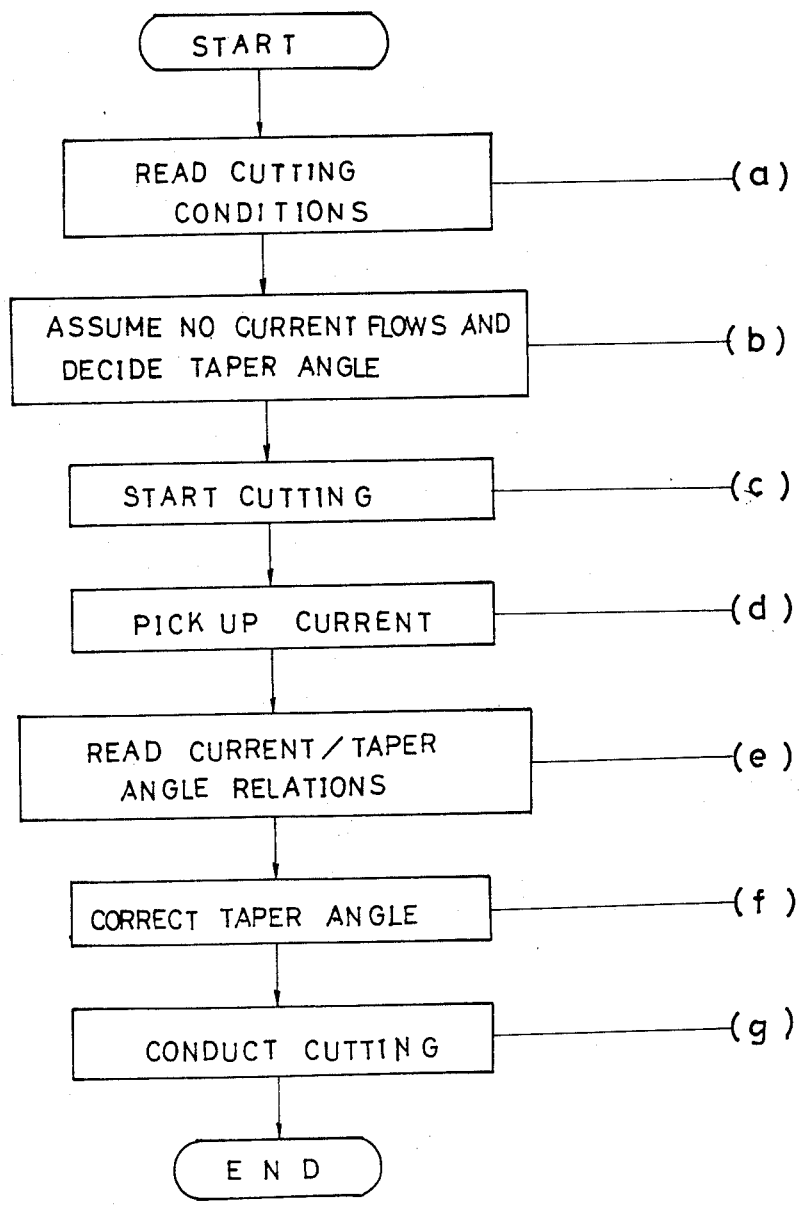
FIG. 9 is a flow chart of a wire electrode type electrical discharge machining apparatus of FIG. 8 in accordance with the third embodiment of this invention.

As repeatedly described earlier, the taper-machining of this invention is conducted by employing a computer. Thus, a flow chart for the taper-machining operation of the third embodiment will be presented below, referring to FIG. 9.

The taper machining controller 9 reads the machining conditions out of the basic controller 8 [step (a)]. An initial taper-angle $\theta$ is determined based on no machining current flowing in the wire electrode 1 [step (b)]. Taper-machining is then commenced with the initial taper-angle $\theta$ which was realized by the U-V axis servomechanisms 71, 72 [step (c)]. Following the commencement of taper-machining, in step (d) the machining current is sensed.

In step (e), correction means 92 reads, out of the memory means 91, the relations between a machining current and the taper-angle $\theta$ required corresponding to the machining current and/or conducts some calculation, if required, to acquire a corrected taper-angle $\theta$ based on the information read out of the memory means 91. A correction is made for the initial taper-angle $\theta$ according to [step (f)].

The U-V axis servomechanisms 71, 72 are allowed to conduct taper-machining with the corrected taper-angle $\theta$, resultantly realizing high accuracy.

The foregoing decription has clarified that this invention has successfully provided a wire electrode type electrical discharge machining apparatus having a taper-machining controller which enables the wire electrode type electrical discharge machining apparatus to perform the taper-machining with high accuracy, even in the case where the hardness of the wire electrode varies due to the variation of the temperature thereof following the variation of the magnitude of electric current flowing therein.

I claim:

1. A wire electrode type electrical discharge machining apparatus comprising:
a wire electrode;
first and second wire guides for guiding said wire electrode, said wire guides being capable of relative movement therebetween for changing a taper angle of said wire electrode;
basic controller means for controlling said machining apparatus, including setting a desired taper angle;
taper machining controller means for controlling the taper angle by controlling the relative movement of said wire guides, said taper machining controller means being input from said basic controller means with data regarding the desired taper angle;
memory means for storing data indicative of relationships between machining currents and taper angles required corresponding to the machining currents;
machining current setting means for setting the machining current; and
correction means for reading out of said memory means the taper angle required corresponding to the machining current set by said machining current setting means and setting a required taper angle adjustment to said taper machining controller means for compensating for changes in wire electrode rigidity due to the machining current.

2. A wire electrode type electrical discharge machining apparatus comprising:
a wire electrode;
first and second wire guides for guiding said wire electrode, said wire guides being capable of relative movement therebetween for changing a taper angle of said wire electrode;
basic controller means for controlling said machining apparatus, including setting a desired taper angle for when no machining current is flowing in said wire electrode;
memory means for storing data indicative of relationships between machining currents and taper angles required corresponding to the machining currents;
taper machining controller means for controlling the taper angle, said taper machining controller means being input with the desired taper angle from said basic controller means when no machining current is flowing in said wire electrode;
machining current program inputting means for sequentially varying the machining current according to a predetermined program; and
correction means for reading out of said memroy means the taper angle required corresponding to the machining current input by said machining current program inputting means and setting a required taper angle adjustment to said taper machining controller means.

3. A wire electrode type electrical discharge machining apparatus comprising:
a wire electrode;
first and second wire guides for guiding said wire electrode, said wire guides being capable of relative movement therebetween for changing a taper angle of said wire electrode;
basic controller means for controlling said machining apparatus, including setting a desired taper angle;
taper machining controller means for controlling the taper angle, said taper machining controller means having the desired taper angle input from said basic controller means before machining is initiated;
machining current sensing means for sensing a present machining current;
memory means for storing data indicative of relationships between machining currents and the taper angle required corresponding to the machining currents; and
correction means for reading out of said memory means the taper angle required corresponding to the present machining current sensed by said machining current sensing means and setting a required taper angle adjustment to said taper machining controller means.

* * * * *

UNITED STATES PATENT AND TRADEMARK OFFICE
CERTIFICATE OF CORRECTION

PATENT NO.   :   4,801,779

DATED        :   January 31, 1989

INVENTOR(S)  :   Haruki Obara

It is certified that error appears in the above-identified patent and that said Letters Patent is hereby corrected as shown below:

Col. 1, line 21, after "category" insert --is--.

Col. 2, line 65, delete "aforementioned" and delete "1".

Col. 5, line 22, after "pulses" insert --across--.

Col. 7, line 38, after "embodiment" insert --will be--.

Signed and Sealed this

First Day of August, 1989

Attest:

DONALD J. QUIGG

Attesting Officer

Commissioner of Patents and Trademarks